(12) United States Patent
Metzger et al.

(10) Patent No.: US 7,562,913 B1
(45) Date of Patent: Jul. 21, 2009

(54) MAGMETER FLANGE ADAPTER

(75) Inventors: Paul Metzger, Pacific, MO (US); Scott Meier, St. Louis, MO (US); Paul Radzom, St. Louis, MO (US)

(73) Assignee: Anheuser-Busch, Inc., St. Louis, MO (US)

( * ) Notice: Subject to any disclaimer, the term of this patent is extended or adjusted under 35 U.S.C. 154(b) by 391 days.

(21) Appl. No.: 11/437,504

(22) Filed: May 19, 2006

Related U.S. Application Data

(60) Provisional application No. 60/683,125, filed on May 20, 2005.

(51) Int. Cl.
*F16L 23/00* (2006.01)

(52) U.S. Cl. .................... 285/412; 73/861.12

(58) Field of Classification Search ............... 285/412, 285/416, 368, 414; 73/151, 155, 152.21, 73/152.29, 152.35, 861.12
See application file for complete search history.

(56) References Cited

U.S. PATENT DOCUMENTS

| | | | | |
|---|---|---|---|---|
| 831,588 | A * | 9/1906 | Wood | 285/148.25 |
| 924,039 | A * | 6/1909 | Clark | 285/10 |
| 1,884,223 | A * | 10/1932 | Rah | 285/50 |
| 3,745,824 | A | 7/1973 | Mannherz et al. | |
| 3,918,919 | A * | 11/1975 | Walburg et al. | 422/193 |
| 4,345,464 | A * | 8/1982 | Herzl et al. | 73/201 |
| 4,487,438 | A * | 12/1984 | Sweeney | 285/349 |
| 4,610,471 | A * | 9/1986 | Halen et al. | 285/337 |
| 4,641,536 | A * | 2/1987 | Jacobsen et al. | 73/861.12 |
| 4,722,231 | A * | 2/1988 | Tanaka et al. | 73/861.12 |
| 4,914,950 | A * | 4/1990 | Uematsu et al. | 73/861.12 |
| 5,113,690 | A * | 5/1992 | van Nistelrooij et al. | 73/861.12 |
| 5,236,228 | A * | 8/1993 | Lawton | 285/30 |
| 5,271,427 | A * | 12/1993 | Berchem | 137/375 |
| 5,307,687 | A * | 5/1994 | Arai et al. | 73/861.12 |
| 5,458,003 | A * | 10/1995 | Ishihara et al. | 73/861.12 |
| 5,526,698 | A * | 6/1996 | Sakurai et al. | 73/861.12 |
| 5,632,632 | A * | 5/1997 | Huotari | 439/100 |
| 5,915,280 | A | 6/1999 | Komatsu et al. | |
| 5,947,528 | A * | 9/1999 | Campbell | 285/16 |
| 6,543,811 | B1 | 4/2003 | Campbell | |
| 6,877,386 | B2 * | 4/2005 | Needham et al. | 73/861.11 |
| 7,318,354 | B2 * | 1/2008 | Visser et al. | 73/861.12 |
| 2006/0022466 | A1 | 2/2006 | Sand et al. | |

FOREIGN PATENT DOCUMENTS

JP 2002340637 A * 11/2002
JP 2007304040 A * 11/2007

* cited by examiner

*Primary Examiner*—David E Bochna
(74) *Attorney, Agent, or Firm*—Storm LLP; Paul V. Storm; Mark D. Perdue

(57) ABSTRACT

A flange adapter for interfacing two different diameters of piping is provided. This flange adapter allows for the integration of a component, such as a magmeter, having a narrower diameter into a system. Such a flange adapter allows for a simple seamless weld that provides relatively smooth interior walls within the system so as to maintain the integrity of the chemical or biochemical processes taking place within the system.

13 Claims, 3 Drawing Sheets

MAGMETER FLANGE ADAPTER

CLAIM OF PRIORITY

This application claims priority to U.S. Provisional Application No. 60/683,125, entitled "MAGMETER FLANGE ADAPTER," filed on May 20, 2005, which is hereby incorporated by reference for all purposes.

TECHNICAL FIELD

The invention relates generally to measuring flow rate within a pipe and, more particularly, to pipe couplings to magnetic-inductive flowmeters (magmeters) used for measuring flow rate in various pipes.

BACKGROUND

Magmeters are used to measure volumetric flow of liquid through pipe. Proper installation requires that the inside diameter (ID) of the pipe match the ID of the magmeter. Accuracy suffers if the IDs do not match. Historically, the market for magmeters has been in the petrochemical industry, which uses piping of schedule 40 thickness. Thus, common magmeters have been designed with a schedule 40 ID.

Specifically, different chemical or biochemical reactions or processes have different pipe diameters, where pressure, flow rate, and other such variables can be both measured and regulated. For example, a brewing operation is a biochemical process that is very closely controlled for both sanitary and quality control reasons. Specifically, the regulation of flow rates is an important component to producing a quality product.

Accordingly, various industries, including the brewing industry, have lower line pressures than the petrochemical industry and have thinner standardized pipes (such as schedule 5 pipe), have larger IDs. For example, a standard, nominal 6-inch schedule 5 pipe for brewing applications would have a larger ID than a nominal 6-inch schedule 40 pipe. Additionally, the brewing industry, specifically, has a requirement to use sanitary piping systems. Thus, using a standard magmeter (dimensioned for schedule 40 pipe) in a brewing piping system (using schedule 5 pipe) introduces a step change in pipe diameter at the junction, which degrades the accuracy and introduces small stagnation points and crevices at junctions, which are potential locations for sanitary problems.

In the past, various manufacturers, such as Anheuser-Busch®, have used adapter sections in the pipe to connect to magmeters. This approach has been shown to have deficiencies for accuracy and for sanitary requirements. Therefore, manufacturers have been developing new techniques to install magmeters.

Therefore, there is a need for a method and/or apparatus for capitalizing on the efficiency of magmeters and other such measurement or interfacing components in conjunction with maintaining the requirements for the specific chemical or biochemical processes.

SUMMARY

The present invention, accordingly, provides a flange adapter having a tapered transition to fit schedule 40 standard piping at a first end, and to fit schedule 5 standard piping at a second end.

In another preferred embodiment of the present invention, the flange adapter is comprised of stainless steel having a sulfur content between 0.005% and 0.018%.

In yet another preferred embodiment of the present invention, the first end further comprises a bore contained therein.

In another preferred embodiment of the present invention, the bore is adapted to receive a magmeter.

In yet another preferred embodiment of the present invention, a transition within the bore between the flange adapter and the magmeter is smooth and linear.

In yet another preferred embodiment of the present invention, the flange adapter contains specific dimensions to facilitate precise welding to pipe.

In yet another preferred embodiment of the present invention, the flange adapter is made thicker to provide required sturdiness and to allow a tapped hole to be used for a grounding screw.

In an alternate embodiment of the present invention, a flow system is provided. A schedule 40 standard magmeter is employed, and a flange adapter is adapted to receive the magmeter at a first end and transition to a schedule 5 standard piping at a second end by a taper. Schedule 5 standard piping is then coupled to the second end of the flange adapter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
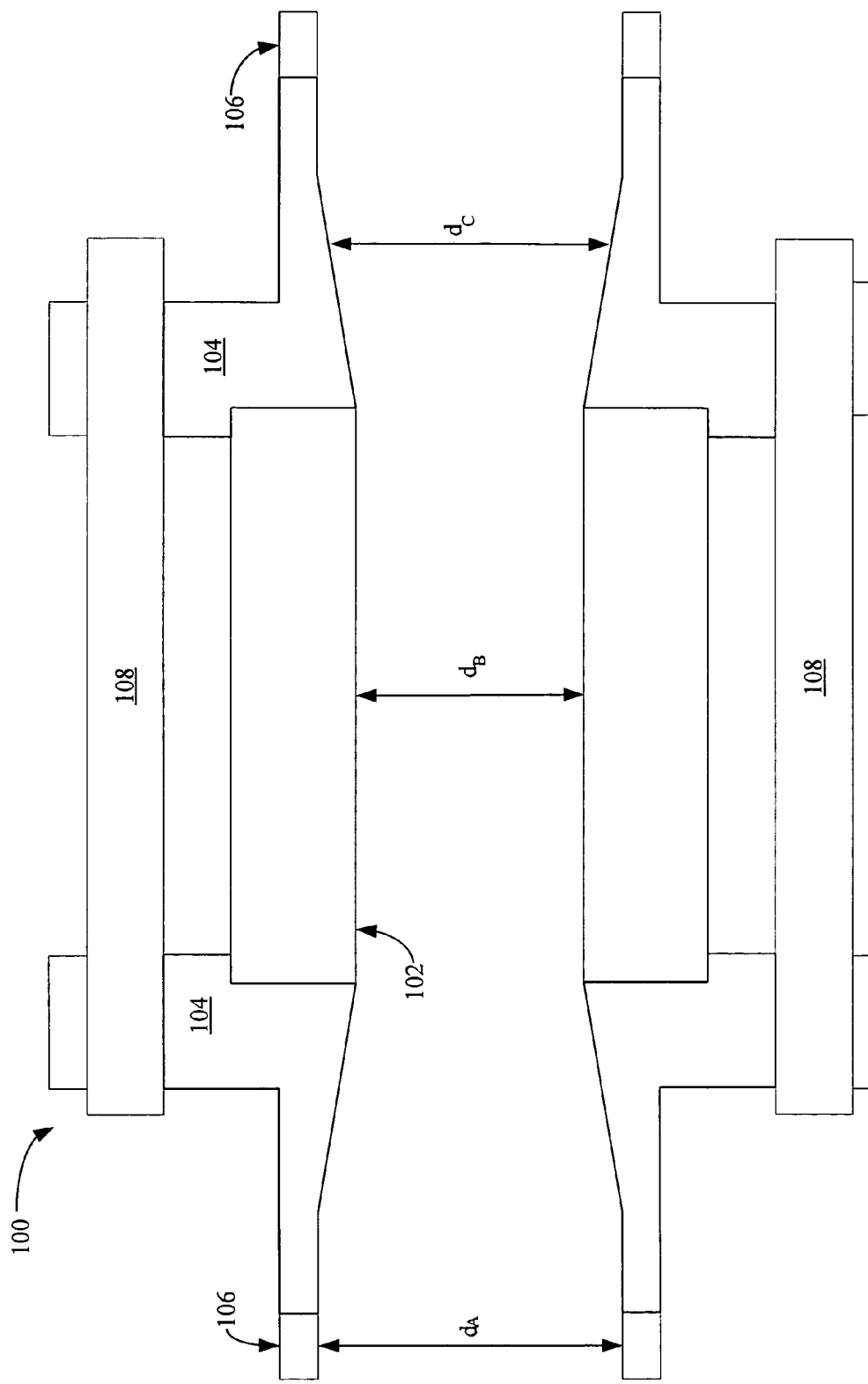
FIG. 1 is a side cutaway view of a flowmeter system.

In the following discussion, numerous specific details are set forth to provide a thorough understanding of the present invention. However, it will be obvious to those skilled in the art that the present invention may be practiced without such specific details.

Refer now to the drawings wherein depicted elements are, for the sake of clarity, not necessarily shown to scale and wherein like or similar elements are designated by the same reference numeral through the several views.

Referring to FIG. 1 of the drawings, the reference numeral 100 generally designates a flow system in accordance with a preferred embodiment of the present invention. The system 100 comprises a magmeter 102, flange adapters 104, and piping 106.

Typically, piping 106 is responsible for carrying fluid within the system 100. For example, for a beer brewing system, piping 106 would be primarily responsible for carrying the brewing or brewed beer throughout the system 100. Typically, this type of piping is what is known as schedule 5 piping. For these applications, nominal pipe sizes between ½ inch and 6 inches are usually employed.

Additionally, piping 106 has a diameter of $d_A$ that remains constant throughout the system 100. For example, with a nominal pipe diameter of 4 inches of American National Standards Institute/American Society of Mechanical Engineers (ANSI/ASME) 36.19M Stainless Steel Pipe, the diameter $d_A$ is about 4.333 inches. The use of piping 106 of constant diameter $d_A$ would, therefore, allow the system to provide the internal surfaces required for sanitary service. Schedule 5 pipe is used because stainless steel costs are relatively high, and it makes economic sense to save material cost and weight by installing the lightest weight pipe allowed for the service.

The magmeter 102, however, is designed to operate at higher pressures and has a smaller diameter $d_B$ than the piping 106. The type of piping that is employed within the magmeter 102 is a standard diameter of piping so that the magmeter 102 can be employed in a wide variety of situations and applications. For example, for a 4-inch magmeter, the diameter $d_B$ can be from about 3.8 inches to about 4.3 inches.

Therefore, to make the transitions back and forth between the differing diameters and schedules of piping, flange adapters 104 are utilized, which are secured into position by bolts 108. Flange adapters 104 do not have a constant diameter; instead, a diameter $d_C$ with a constant rate of change is employed. In other words, the interior walls of flange adapter 104 are tapered or conical. Additionally, in some cases, magmeters, such as magmeter 102, can have diameters that are not constant, but instead are tapered or conical at the ends. Thus, under these circumstances, the diameter $d_C$ of the flange adapter 104 can be adapted to match the ID at the ends of the magmeter.

Figure 2A:
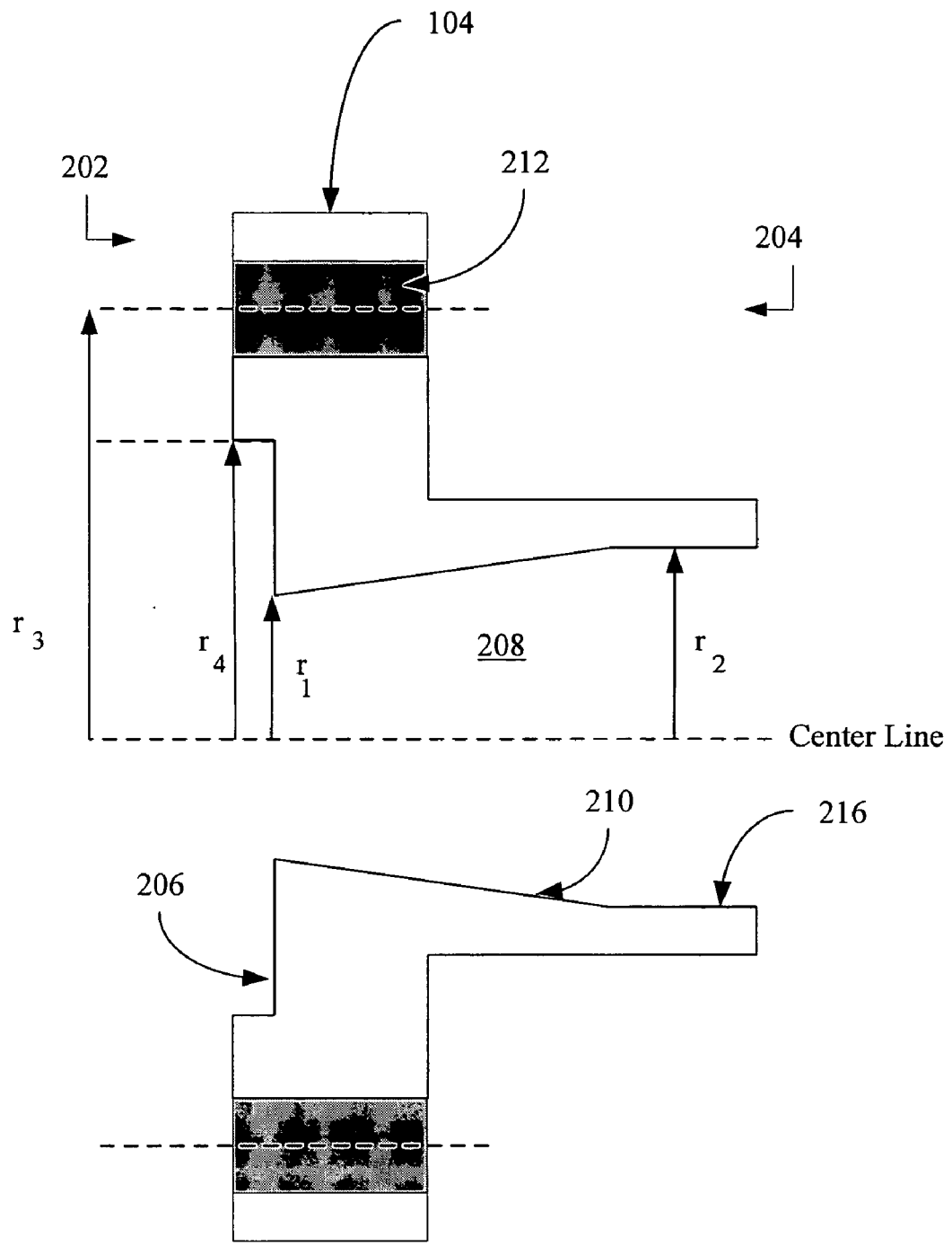
FIG. 2A is a cutaway view of the flange adapter in accordance with a preferred embodiment of the present invention.
Figure 2B:
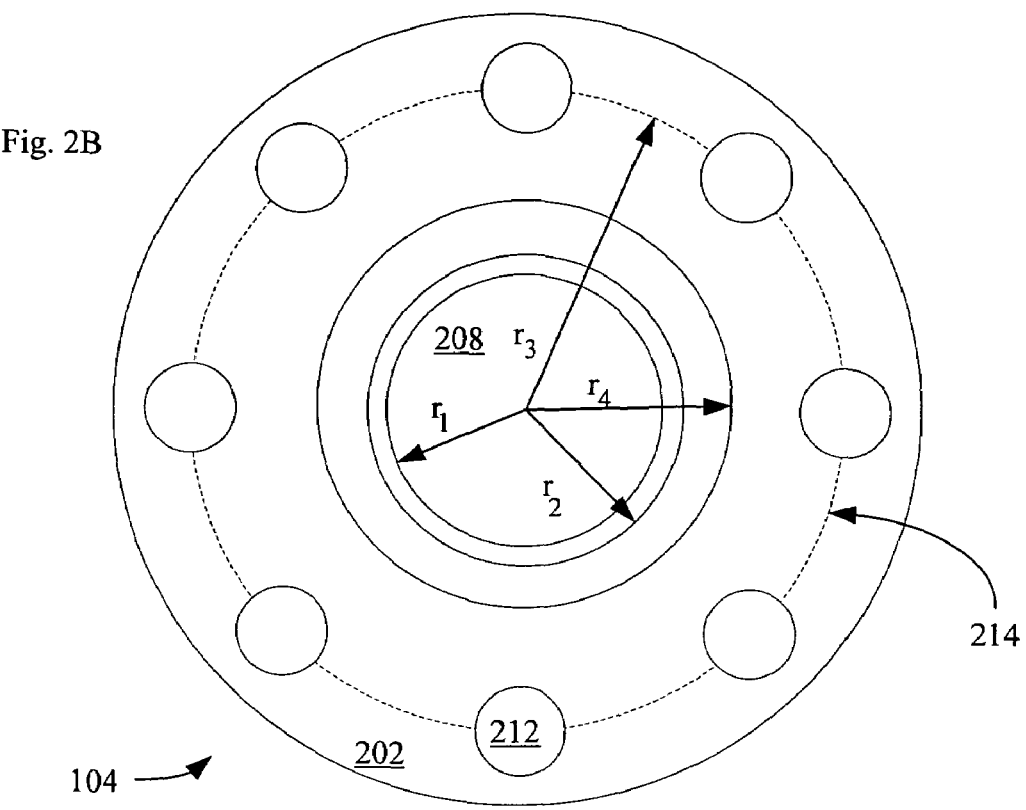
FIG. 2B is a front view of the flange adapter shown in FIG. 2A.

It, however, is known to transition from different interior diameters or radii of piping. Flange adapters 104, thus, have an important feature, where the specifics of its design and operation are an improvement over previous designs. Referring to FIGS. 2A and 2B of the drawings, the reference numeral 104 generally designates a flange adapter in accordance with a preferred embodiment of the present invention. In this particular embodiment, flange adapter 104 comprises a centered duct 208, which provides a fluid passage extending from front 202 to back 204.

The centered duct 208, however, is not simply a passage having a uniform diameter. Instead, the centered duct 208 comprises a tapered bore 210 and a straight bore 216. At the front of the flange adapter 104, the tapered bore 210 is narrowest with a first radius $r_1$. The tapered bore 210, then, extends toward the back, becoming increasingly broad until a maximum, second radius $r_2$ is reached. At the point where the taper reaches the second radius $r_2$, the straight bore 216 extends seamlessly therefrom, retaining the second radius $r_2$.

Having a complete duct 208 that is both tapered and straight provides a benefit to coupling different components together. Because flange adapter 104 is generally comprised of metal, such as stainless steel, flange adapter 104 can be welded to other piping or components.

Clearly, flange adapter 104 is able to be removably coupled to a component or pipe, such as magmeter 102, at its narrowest point and can be welded to piping, such as piping 106, at its widest point. However, welding at tapers or at points where the rate of change of the internal radii is not zero can be difficult. In specific applications, welds can be of particular concern, such as in a brewing application where crevices in the interior of the piping can allow for microbial colonies to form which lead to unsanitary conditions. Thus, the ability to weld two sections of piping together that are the same diameter or radius allows for welds of proper quality. The use of the straight bore 216 can therefore reduce improper welds to pipe sections while allowing a smooth transition from a narrow pipe section to a wider pipe section.

Additionally, it is not advantageous to perform welds at both junctures of flange adapter 104. A component, such as magmeter 102, should be periodically removed for servicing or replacement, and is typically not designed to be welded onto a pipe. Thus, at a radial distance $r_3$ from the center of the flange adapter 104, a bolt circle 214 is formed on an enlarged-diameter flange. The centers of a plurality of bolt holes 212 are along this bolt circle 214, and the holes are symmetrically arranged relative to the center of the bolt circle 214. Each of the holes 212, too, extend from the front side 202 to the back side 204 so that bolts 108 can secure the magmeter 102 into the flange adapter 104. As an example, which is shown in FIG. 2B, there are eight through holes 212 arranged in opposition to one another so that a retaining force can be evenly distributed across the entire flange adapter 104.

A counter bore 206 is employed in conjunction with the bolt holes 212 and bolts 108 to retain a component or piping, such as magmeter 102. The radius $r_4$ of the counter bore 206 is roughly equivalent to the outer radius of a component or piping, such as magmeter 102, to which flange adapter 104 couples. This counter bore 206 operates as a seat for the component, allowing for both ease of alignment and the ability to provide a better seal between flange adapter 104 and a component, such as magmeter 102.

In one preferred embodiment of the present invention, the flange adapter 104 is comprised of metal, such as stainless steel, cast iron, copper, galvanized iron, and so forth. For brewing applications, in particular, stainless steel with a sulfur content between 0.005% and 0.018% is employed to ensure approved quality welds.

Figure 3:
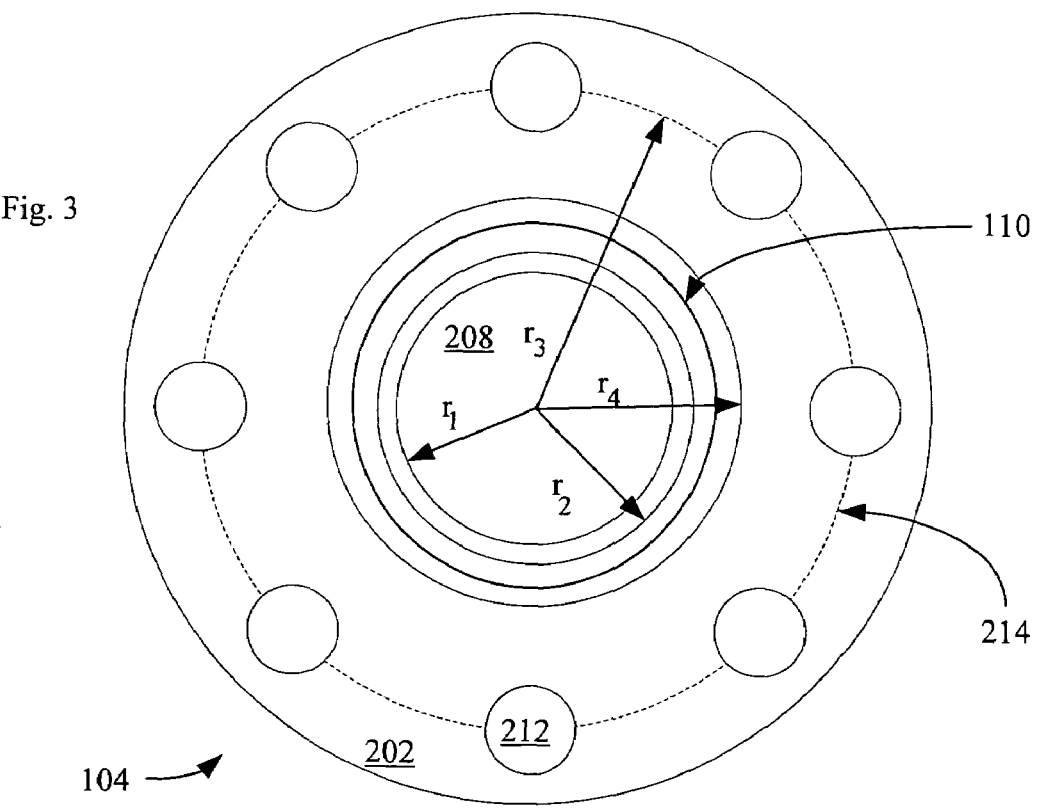
FIG. 3 is a is a front view of the flange adapter, which includes a seat.

Additionally, in another preferred embodiment, as shown in FIG. 3, an additional seat 110 can be provided within the bore 206 that is adapted to receive a deformable seal (not shown).

In yet another preferred embodiment of the present invention, the flange adapter 104 is made thicker to provide required sturdiness and to allow a tapped hole to be used for a grounding screw.

Thus, the flange adapter 104 allows for easy implementation with quality welds for junctures where there is an inner diameter change. Thus, magmeters and other such narrow inner diameter equipment can become more widely implemented throughout other industries that utilize different standards of piping, particularly in the brewing industry.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A flange adapter having a tapered interior transition to fit a schedule 40 standard magmeter at a first end and to fit schedule 5 standard piping at a second end, the flange adapter comprising:

a body having a first end and a second end;

a passage extending through the body from the first end to the second end, the passage having a tapered bore and a straight bore, wherein the tapered bore has an inner diameter equal to an inner diameter of the magmeter at the first end and the straight bore having an inner diameter equal to an inner diameter of the schedule 5 standard piping at the second end; and a counter bore in the first end, the counter bore dimensioned to receive the magmeter.

2. The flange adapter of claim 1, wherein the flange adapter is comprised of stainless steel having a sulfur content between 0.005% and 0.018%.

3. The flange adapter of claim 1, wherein a transition between the tapered bore and the magmeter is smooth.

4. The flange adapter of claim 1, wherein the first end includes a seat adapted to receive a deformable seal.

5. The flange adapter of claim 1, wherein the flange adapter includes a plurality of uniformly distributed bolt holes formed in the body to connect the flange adapter with a similar flange adapter on an opposite end of the magmeter.

6. The flange adapter of claim 5, wherein the bolt holes are arranged along the periphery of a circle.

7. A flow system comprising:
   a schedule 40 standard magmeter;
   a pair of flange adapters for connecting the magmeter to a fluid conduit, and each flange adapter including:
     a body having a first end and a second end;
     a passage extending through the body from the first end to the second end, the passage having a tapered bore, the tapered bore having an inner diameter equal to an inner diameter of the magmeter at the first end and an inner diameter equal to the inner diameter of the fluid conduit at the second end; and
     a counter bore in the first end, the counter bore dimensioned to receive the magmeter; and
   at least one fastener for securing each of the flange adapters to the magmeter.

8. The flow system of claim 7, wherein the flange adapter is comprised of stainless steel having a sulfur content between 0.005% and 0.018%.

9. The flow system of claim 7, wherein the counter bore between the flange adapter and the magmeter is smooth.

10. The flow system of claim 7, wherein the first end includes a seat adapted to receive a deformable seal.

11. The flow system of claim 7, wherein the flange adapter includes a plurality of uniformly distributed bolt holes formed in the body to connect the flange adapter with a similar flange adapter on an opposite end of the magmeter.

12. The flow system of claim 11, wherein the bolt holes are arranged along the periphery of a circle.

13. The flow system of claim 7, wherein the schedule 5 standard piping has a nominal diameter of about 4 inches.

* * * * *